(12) United States Patent
Achal et al.

(10) Patent No.: US 7,884,931 B2
(45) Date of Patent: Feb. 8, 2011

(54) OPTICALLY MULTIPLEXED IMAGING SYSTEM AND METHODS OF OPERATION

(75) Inventors: Stephen Achal, Calgary (CA); Clifford Anger, Canmore (CA)

(73) Assignee: ITRES Research Limited, Calgary (CA)

( * ) Notice: Subject to any disclaimer, the term of this patent is extended or adjusted under 35 U.S.C. 154(b) by 818 days.

(21) Appl. No.: 11/708,536

(22) Filed: Feb. 21, 2007

(65) Prior Publication Data
US 2007/0274714 A1 Nov. 29, 2007

Related U.S. Application Data

(60) Provisional application No. 60/743,338, filed on Feb. 22, 2006.

(51) Int. Cl.
G01J 3/28 (2006.01)
(52) U.S. Cl. ...................................... 356/326
(58) Field of Classification Search ................. 356/326, 356/328
See application file for complete search history.

(56) References Cited

U.S. PATENT DOCUMENTS

| 4,329,050 | A | 5/1982 | Olsen |
| 4,682,029 | A | 7/1987 | Diepeveen et al. |
| 4,765,564 | A | 8/1988 | Colvocoresses |
| 4,989,086 | A | 1/1991 | Schaff et al. |
| 5,049,740 | A | 9/1991 | Pines et al. |
| 5,276,321 | A | 1/1994 | Chang et al. |
| 5,363,235 | A | 11/1994 | Kiunke et al. |
| 5,418,364 | A | 5/1995 | Hale et al. |
| 5,751,473 | A | 5/1998 | Runciman |
| 5,768,040 | A | 6/1998 | Macenka et al. |
| 5,781,290 | A | 7/1998 | Bittner et al. |
| 5,936,771 | A | 8/1999 | Cooper |
| 6,122,051 | A | 9/2000 | Ansley et al. |
| 6,288,781 | B1 | 9/2001 | Lobb |
| 6,774,366 | B1 | 8/2004 | Friedman et al. |
| 6,888,141 | B2 | 5/2005 | Carr |
| 6,903,343 | B2 | 6/2005 | Amon et al. |

(Continued)

FOREIGN PATENT DOCUMENTS

CA        2225583        6/1998

OTHER PUBLICATIONS

International Search Report mailed Jun. 7, 2007 in international application No. PCT/CA2007/000275.
English Abstract of Japanese Patent Publication No. 63-198832.

(Continued)

*Primary Examiner*—Alessandro Amari
(74) *Attorney, Agent, or Firm*—Davidson Berquist Jackson & Gowdey, LLP; Brian Siritzky

(57) ABSTRACT

The invention describes an optical multiplexer for increasing optical data collection efficiency across at least two fields of view. The optical multiplexer includes a first optical path for operatively receiving optical data from a first field of view and at least one beam deflection system for operatively receiving optical data from at least a second field of view. The optical multiplexer also includes an optical train for focusing the optical data passing through the optical train onto adjacent sections of a focal plane array. The invention provides improvements including expanded across-track swaths, higher spatial resolution, imaging of real-time references on every frame, coincident imaging along separate paths, stereo imaging and other increases in imaging functionality.

23 Claims, 7 Drawing Sheets

U.S. PATENT DOCUMENTS

| | | |
|---|---|---|
| 7,038,191 B2 | 5/2006 | Kare et al. |
| 7,382,498 B1 * | 6/2008 | Cook ........................ 356/328 |
| 7,386,226 B2 | 6/2008 | Miyoshi et al. |
| 7,518,722 B2 | 4/2009 | Julian et al. |
| 7,554,572 B2 | 6/2009 | Takahashi |
| 2004/0156048 A1 | 8/2004 | Mitchell |

OTHER PUBLICATIONS

Extended European Search Report mailed Nov. 10, 2009 in European Application No. 07710638.3.
U.S. Appl. No. 11/882,227—Jul. 22, 2010 PTO Office Action.
U.S. Appl. No. 11/882,227—Feb. 18, 2010 PTO Office Action.

* cited by examiner

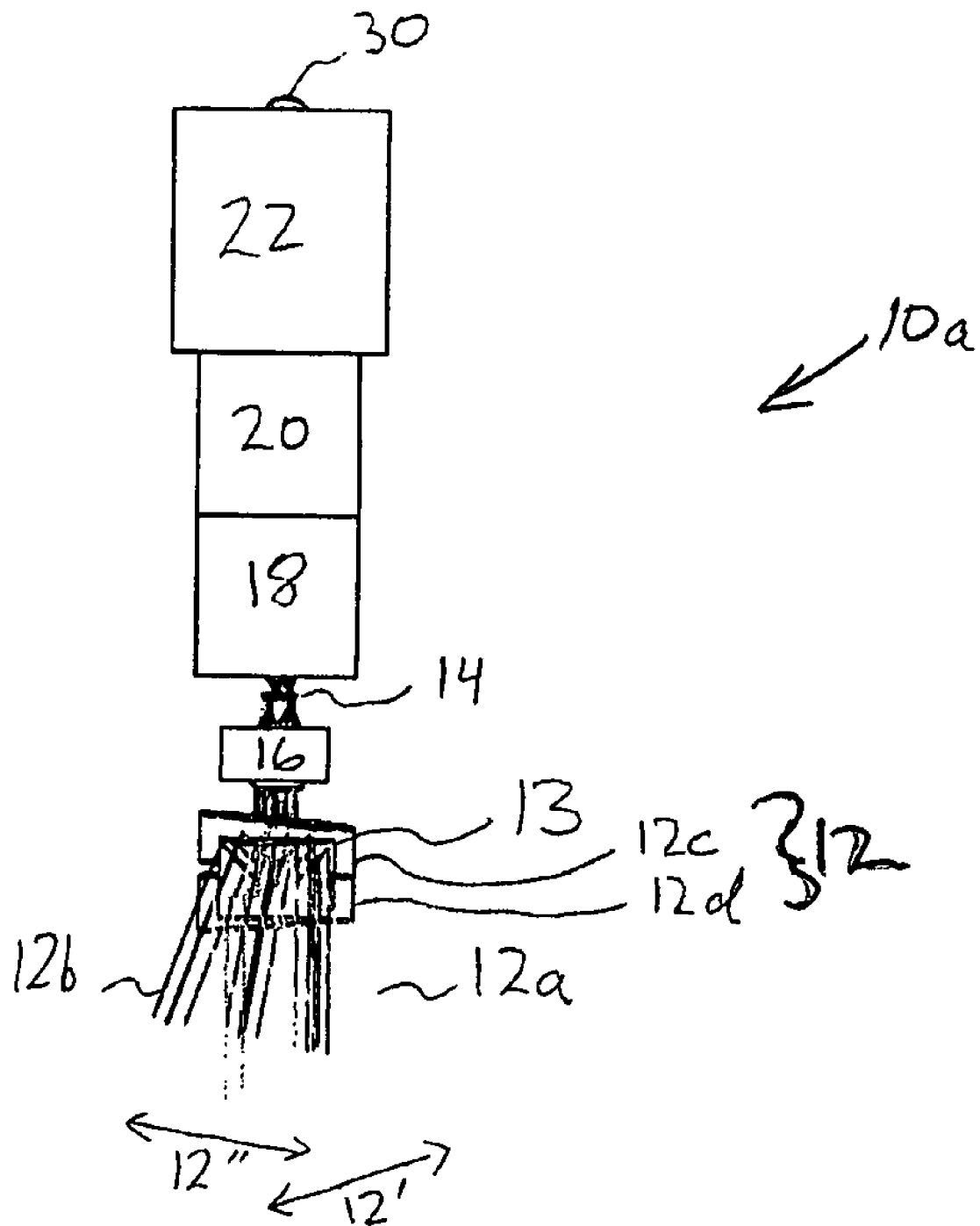

OPTICALLY MULTIPLEXED IMAGING SYSTEM AND METHODS OF OPERATION

RELATED APPLICATIONS

This application claims the benefit of priority from U.S. application 60/743,338 filed Feb. 22, 2006.

FIELD OF THE INVENTION

The invention describes an, optical multiplexer for increasing optical data collection efficiency across at least two fields of view. The optical multiplexer includes a first optical path for operatively receiving optical data from a first field of view and at least one beam deflection system for operatively receiving optical data from at least a second field of view. The optical multiplexer also includes an optical train for focusing the optical data from the above optical paths onto adjacent sections of a focal plane sensor array. In various embodiments, the invention enables expanded across-track swaths, higher spatial resolution, imaging of real-time references on every frame, coincident imaging along separate paths, stereo imaging and other improvements in imaging functionality.

BACKGROUND OF THE INVENTION

Different imager systems are well known systems for collecting and processing optical data. Known imager systems include so-called "pushbroom", "whiskbroom" and "frame" imagers. Within this document "optical data" means electromagnetic radiation in the form of electromagnetic rays having wavelengths ranging from ultraviolet through the infrared.

Pushbroom imagers are widely used in remote sensing instrumentation. Such imagers are typically used in situations where there is relative motion between the area being imaged and the imager. Such motion can be provided by mounting the imager on a vehicle, aircraft or satellite and traversing an area of interest with the imager oriented so that the area of interest passes through the field-of-view of the imager. Alternatively, the imager may be fixed and the area of interest moves through the field-of-view of the imager as, for example, on a conveyor belt. The typical result of imaging is the creation of a strip image, produced by imaging one entire line within the field of view at a time, or possibly a series of contiguous lines, approximately at right angles to the track of the relative motion between the imager and the area of interest.

In comparison, a whiskbroom imager images a single point at a time and scans this point at right angles to the track to build up a line image. A frame imager collects a series of fixed frame two-dimensional images along the track.

A pushbroom imager can utilize one or more sensors in the focal plane of the imager consisting of a linear array of sensing pixels or a two-dimensional array of sensing pixels. Linear or two-dimensional arrays can be referenced generically as "focal plane arrays" (FPA).

Typically, a spectrographic push-broom imager has a narrow slit, usually installed at the image plane of an optical train, such that only a narrow portion of the field of view, typically at right angles to the direction of relative motion between the spectrograph and the area being imaged, is passed through the slit into a second optical train (containing spectrally dispersive optical elements) and onto a focal plane array (usually a two-dimensional focal plane array). This narrow spatial area passing the slit is typically referred to as the "across-track line image". The two-dimensional focal plane array is typically oriented such that the optical elements of the spectrographic push-broom imager align the across-track line image along one axis of the array and spectrally disperse the light from this image at right angles along the other orthogonal ("column") axis of the array. Hence, each "row" of the sensor is exposed to light from the field-of-view of the same across-track line image on the ground (or other area of interest) but at a different wavelength. Similarly, each column of the sensor records the spectrum of a given point within the across-track line image.

The spectrally dispersed light energy or optical data of the across-track line image creates a measurable change in information in each exposed pixel of the focal plane array. Typically, the measurable change in information in each pixel or some combination of pixels is read out by the electronics associated with the imager at some desired integration time. The mode of sampling and the length of the integration times can vary according to the details of the specific instrument design and the operational parameters selected for a particular measurement. As multiple, spectrally-dispersed, across-track line images are read out and recorded on suitable recording media, a "spectral image" of the total area viewed by the multiple across-track line images is created. In the context of this description, the definitions of "row" and "column" are a matter of convention and are not relevant to the substance of the invention.

Often, the number of individual spectral values associated with one spatial column of the focal plane array is much smaller than the number of desired spatial columns that define the across-track swath of the imager. Increasing the spectral resolution is accomplished by spreading the available radiation from any given point in the scene over as many different rows as there are spectral bands. A large number of spectral bands results in a weaker signal, such that a tradeoff must be made between spectral resolution and signal-to-noise ratio, which is governed, in part, by the amount of energy striking each pixel. This trade-off usually means that the number of spectral bands desired (rows) is often far less than the available number of rows on typical sensor focal plane arrays along the spectral axis (which is typically chosen to be the smaller of the two dimensions in a rectangular focal plane array).

Thus, the number of across-track pixels available from pushbroom imagers is often limited by the pixel arrangement of commercially available focal plane sensor arrays. Such focal plane sensor arrays are usually designed for two-dimensional scene imaging and tend to have approximately equal dimensions for rows and columns. In contrast, the ideal sensor for imaging spectroscopy would have a very large number of columns (spatial information) compared to its number of rows (spectral information). Thus current designs for pushbroom imaging spectrometers can under-utilize the focal plane rows (used for the spectral dimension) and lack the desired number of columns (for the across-track spatial dimension).

This poor utilization of the focal plane array can be mitigated by designing specialized custom sensor arrays. However, specialized custom sensor arrays can only be produced at very high costs that tend to defeat the objectives of providing commercially viable pushbroom imaging instruments and in addition there are often practical constraints as to the maximum dimension of an array due to fabrication limitations.

The net result of this "standard" focal plane geometry is that the desired spatial resolution may be compromised. Compromised spatial resolution will, as a result, increase the required number of separate passes over the scene of interest that are needed to cover an area due to the limited swath width. An increase in the number of passes increases the time and cost to acquire such imagery.

Moreover, even if focal plane arrays with large numbers of spatial pixels were available, the standard design would lead to the need for increased dimensions of the optical components to accommodate the larger image dimension, resulting in substantially greater size and costs of the optics.

Hence, there has been a need for a system that permits more efficient usage of the optical focal plane. In particular, there has been a need for creating a "virtual" focal plane array that has many more across-track spatial pixels (columns) than the number of pixels in the spectral direction (rows) while still employing optics consistent with the original image format. Further still, there has been a need for imaging systems that enable efficient use of system optics that enable the collection of optical data from one or more fields of view wherein the optical data from each field of view is passed through a common optical train in order to minimize the physical size of the optical components.

Similarly, the same problem arises with non-spectrographic pushbroom imagers. In the visible and near-Infrared wavelength range, there is a ready supply of long linear sensor arrays with thousands of pixels. For this wavelength region, these long linear arrays can address the problem as described above for providing a wide (high resolution) swath. However, better sensor availability does not address the problem of the concomitant need for larger optical elements to accommodate these long linear arrays.

For non-spectrographic pushbroom images designed for other parts of the spectrum, such as the short-wave and thermal Infrared, the most cost effective sensors may be two-dimensional arrays with approximately equal numbers of rows and columns. For these wavelength regions, similarly, there has been a need for creating a "virtual" focal plane array that is substantially greater than the maximum physical dimension of the array.

Similarly, although spectrographic imagers typically employ a single slit and then image the slit through wavelength-dispersing optics onto a sensor array, certain types of spectrograph optics can function the same way with multiple parallel slits. In these imagers, multiple spectra are produced in the focal plane which are displaced at right angles to the slits according to the separation of the slits. In this case, it is only necessary that the slits be sufficiently separated to avoid overlap of the spectra. Accordingly, there is also a need for improved imaging systems that enable efficient usage of the optical focal plane in spectrographic imaging systems utilizing multiple slits.

A review of the prior art reveals that past systems have not provided an effective solution to the above problems.

U.S. Pat. No. 5,936,771 describes narrow and wide field of view forward looking Infrared (FLIR) optics with mechanical switching between the different fields of view.

U.S. Pat. No. 6,903,343 describes a system of lightweight laser designator ranger FLIR optics. This is a complex system that divides incoming radiation from a single aperture, and passes it through separate optics onto two different sensors to give wide and narrow fields of view. This patent describes a system in which incoming radiation from a single scene is divided between separate optical systems and does not employ a common set of optics.

U.S. Pat. No. 6,888,141 describes a frame imager that uses a pyroelectric film illuminated by thermal radiation to modulate the reflection of visible light and form an image on a visible light detector array. In this system, incident visible radiation that is less well reflected produces additional heating of the pyroelectric layer, causing positive feedback and increasing the gain of the system.

U.S. Pat. No. 6,774,366 describes an image integration and multiple laser source projection system. The system does not describe an imaging system in which optical data from two or more fields of view is simultaneously passed through a common optical path.

U.S. Pat. No. 5,751,473 describes a dual waveband optical system that uses a dual wavelength quantum well sensor array. In this system a dichroic beamsplitter separates mid-wave infrared (MWIR) and long-wave infrared (LWIR) radiation, passing first through additional optics that increase the focal length and provide a narrow field of view. The beam diversion is internal to the optics rather than separate, and emphasizes providing one narrow field of view within a broader field of view. In addition, this system does not spread the separate fields of view across a single or multiple detectors but rather employs a single dual-wavelength detector.

U.S. Pat. No. 5,414,364 describes an optically multiplexed dual line of sight forward looking infrared (FLIR) system using a chopper to alternate a single sensor array between two separate optical trains having distinct fields of view. As such, the sensor views two fields of view consecutively, alternating between them, thus using temporal rather than spatial multiplexing.

U.S. Pat. No. 5,049,740 also describes a multiple field of view sensor and system that mechanically alternates between narrow and wide fields of view.

U.S. Pat. No. 4,765,564 describes a solid state apparatus for imaging. The patent describes a system that splits the radiation from a single field of view by employing wavelength-dependent filtering. The patent does not describe an imaging system in which optical data from two or more fields of view is simultaneously passed through a common optical path.

U.S. Pat. No. 4,682,029 describes a dual infrared (IR) scanner setup for stereo imaging. The system includes two scanners that alternately illuminate a single detector array.

SUMMARY OF THE INVENTION

In accordance with the invention, there is provided an optical multiplexer system enabling improvement in the efficiency of optical data collection by creating multiple fields-of-view at the focal plane array (a "virtual" focal plane array). This virtual focal plane array enables imaging of an increased number of pixels in the across-track dimension (or other dimensions) by efficient utilization of one or more physical focal plane sensor arrays.

This increased number of across-track pixels can be used to improve the spatial resolution of the image, increase the swath width, provide various combinations of improved spatial resolution and increased swath width or provide other functionalities arising from differing fields-of-view, or multiple imaging of the same field-of-view.

In one embodiment, if the multiple fields-of-view images are of approximately the same area (even if not at the same time or the same viewing angle), the system in accordance with the invention can provide other functionalities arising from multiple looks of the same area including improved stereo imaging or other advantages such as different spectral ranges or adaptability to differing light conditions.

In other embodiments, using beam deflection principles, the invention provides systems that can be used for panchromatic or broad-band imagers to provide an increased number of across-track pixels when used with one or more focal plane sensor arrays.

Accordingly, in one embodiment, the invention provides an optical multiplexer for increasing optical data collection efficiency received simultaneously across two or more fields of view comprising: a first optical path for operatively receiving optical data from a first field of view; a second optical path having a second optical path beam deflection system for operatively receiving optical data from a second field of view, the first optical path and second optical path beam deflection system for directing the optical data from the first and second fields of view through a common optical train, the optical train for focusing the optical data passing through the optical train onto different sections of one or more focal plane arrays.

In one embodiment, the first optical path includes a first optical path beam deflection system. In another embodiment, the optical data from the first and second fields of view is directed through two different optical slits within the common optical train, one slit corresponding to each field of view.

The system may also include an additional common beam deflection system optically connected to the first and second optical path beam deflection systems for operatively directing optical data to the common optical train.

In further embodiments, the first and second optical paths are operatively oriented to provide side by side fields of view or to provide the same or different fields of view. The first and second optical paths may also be oriented such that each field-of view is directed in an approximately nadir direction but with a differing fore-aft viewing direction for creating stereo image data.

In a further embodiment, the optical train is enabled for spectrographic imaging wherein two or more slits are coupled to a second optical train that provides wavelength dispersion.

In another embodiment, the optical train enables wavelength dispersion of optical data from each field of view and wherein dispersed optical data corresponding to each spatial position from each field of view is recorded onto separate focal plane arrays corresponding to each field of view.

In yet another embodiment, each focal plane array has a sufficient number of rows in the spectral dimension enabling at least two fields-of-view to be measured on adjacent sections of a single focal plane array.

In another embodiment, the system includes more than two beam deflection systems and a corresponding number of focal plane arrays or sections on one or more focal plane arrays to receive optical data from corresponding fields of view. The system may also include more than two beam deflection systems and a corresponding number of optical slits for operatively receiving optical data from corresponding fields of view.

In one embodiment, the two optical slits have different widths.

In further embodiments, the system includes one or more bandpass or other optical filters optically connected to the optical train. The optical train may also include one or more wavelength dependent filters to limit the spectral range of optical data reaching the one or more focal plane arrays to prevent overlap from spectrally dispersed fields-of-view.

The focal plane array may comprise photon sensing elements or energy flux sensing elements. The focal plane array may also comprise separate focal plane arrays.

In another embodiment, at least one field of view may include at least one calibration source.

In another embodiment, the optical train includes an aperture that is restricted in one dimension to reduce the separation distance of at least one optical path of a corresponding optical path beam deflection system from the focal plane array while minimizing degradation in sensitivity and signal to noise ratio.

In another embodiment, any one of the first and second optical path beam deflection systems and optical train are dimensioned to enable multiple rows of a focal plane array sensor to obtain a two-dimensional view of the scene without vignetting.

In yet another embodiment, the invention provides an optical multiplexer comprising: a first beam deflection system for operatively receiving and re-directing spectral data from a first field of view; a second beam deflection system for operatively receiving and re-directing spectral data from a second field of view; a double slit having first and second adjacent optical slits, the first optical slit optically connected to the first beam deflection system and the second optical slit optically connected to the second beam deflection system; and a focal plane array optically connected to the double slit through a common optical train wherein spectral data passing through the first and second optical slits is focused on adjacent sections of the focal plane array

BRIEF DESCRIPTION OF THE DRAWINGS

The invention is described by the following detailed description and drawings wherein:

FIG. 2 is a schematic aft view of an optical multiplexer in accordance with one embodiment of the invention with optical slits;

DETAILED DESCRIPTION

In accordance with the invention and with reference to the figures, embodiments of an optical multiplexer 10 are described.

Figure 1:
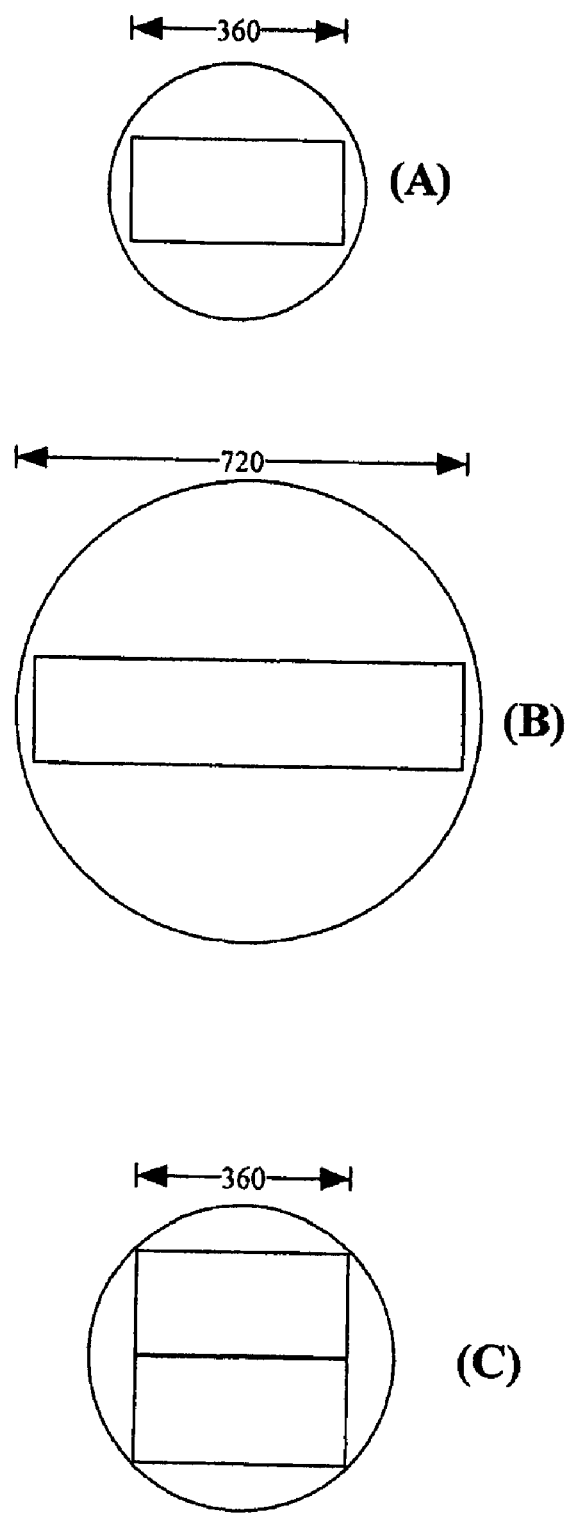
FIG. 1 is a schematic plan view comparing the relative dimensions of the focal plane array and optics in accordance with the prior art (A) and (B) and the invention (C)
Figure 1A:
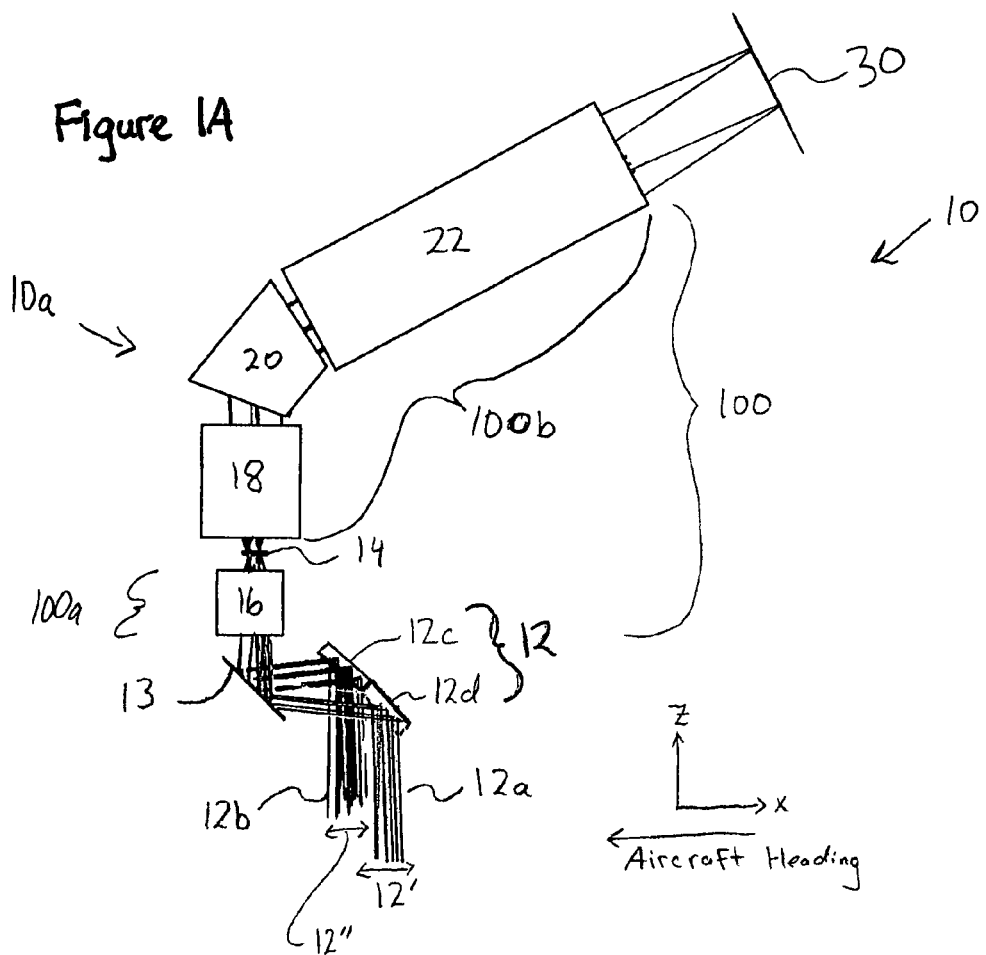
FIG. 1A is a schematic side view of an optical multiplexer in accordance with one embodiment of the invention with optical slits.
Figure 1B:
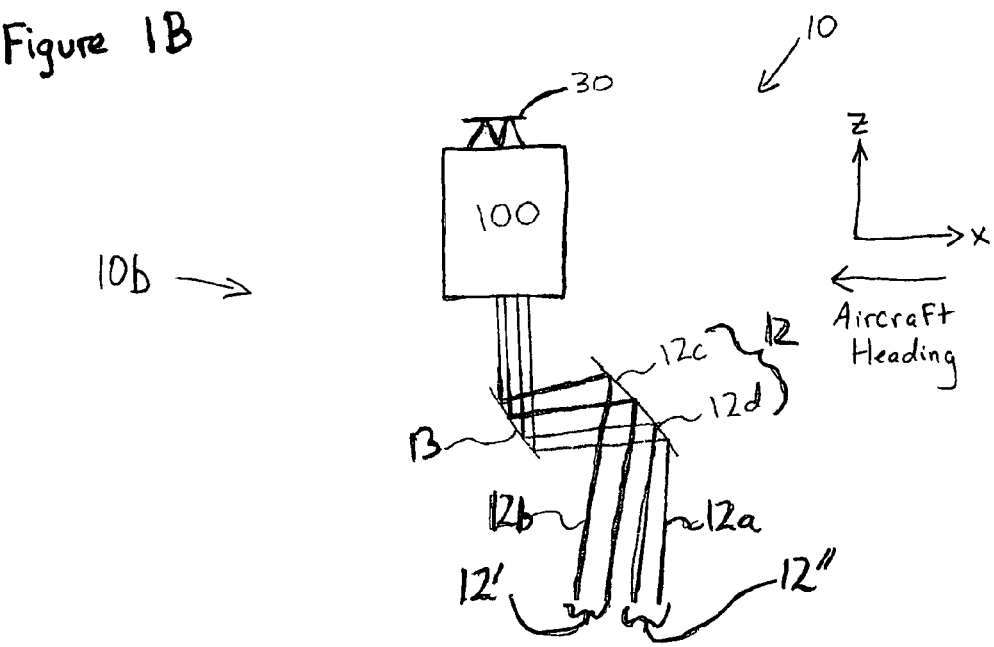
FIG. 1B is a schematic side view of an optical multiplexer in accordance with one embodiment of the invention without optical slits.

Generally, the optical multiplexer 10 includes a first optical path 12a for operatively receiving optical data from a first field of view 12' and at least one beam deflection system 12c for operatively receiving optical data from at least a second field of view 12" (FIG. 1B). The first and second fields of view (FOVs) may be identical and more than two FOVs may be imaged. The first optical path and at least one beam deflection system direct the optical data from the first 12' and at least second 12" fields of view through an optical train 100, the optical train for focusing the optical data passing through the optical train 100 onto adjacent sections of a focal plane array 30. In different embodiments, the focal plane array 30 may be a single sensor array or be comprised of separate sensor arrays that may be of a similar type or be different from one another. It should be noted that within the drawings, any representations of ray paths are schematic and may not represent true ray paths for any illustrated optics as would be understood by those skilled in the art.

In one embodiment, instead of a sensor at the focus of the optical train 100*a*, 16, an optical slit system 14 can be employed (FIG. 1A), which forms the entrance to a second optical train 100*b*, that passes the radiation through a wavelength dispersing medium. In this embodiment, the optical data is imaged onto a second focal plane where the one or more sensor arrays 30 are located. The second optical train 100*b* is often referred to as an "imaging spectrograph" and as shown in FIG. 1A is a subsystem of the complete optical train 100.

In another embodiment, an optical slit system 14 and second optical train 100*b* can be employed to create two optical paths that focus at differing locations at the focal plane 30 of the second optical train 100*b*. If the beam deflection systems are oriented so that the two optical paths are imaging the same field of view, then the two optical paths 12*a*, 12*b* can pass through differing filter mechanisms within the optical train 100*b* so as to provide additional information about the field of view. For example, one path could pass through a polarizing filter such that both polarized and non-polarized images of the same field of view are created at the focal plane array.

Figure 3:
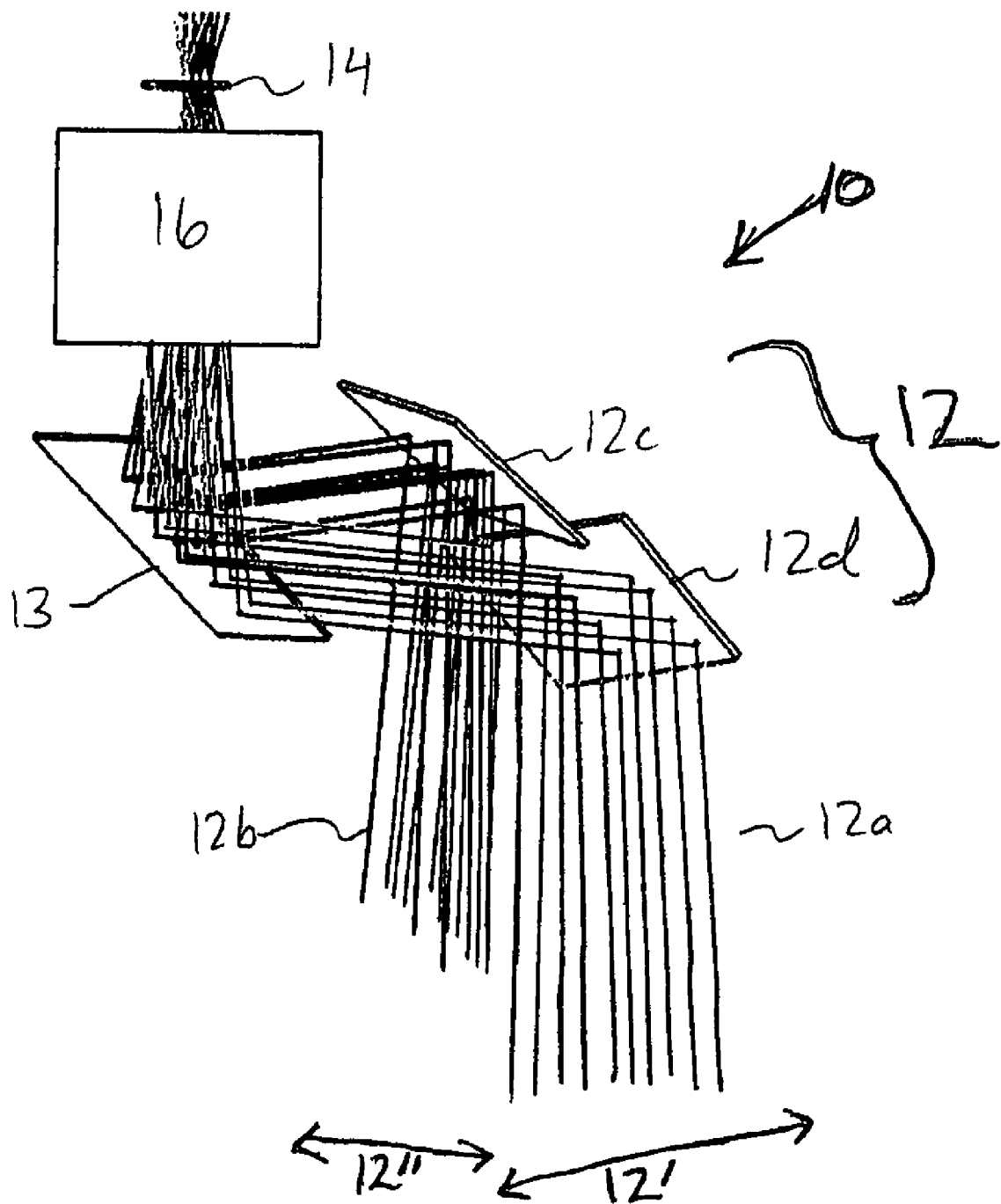
FIG. 3 is a schematic isometric view of beam deflecting elements in accordance with one embodiment of the invention with optical slits.

In further embodiments, the optical slit system 14 may include a number of slits corresponding to the number of fields of view being observed. Thus, as optical data from multiple FOVs is passing through a common optical train systems as shown in FIGS. 1A, 2 and 3 for two fields of view, the optical multiplexer thereby enables the efficient use of a focal plane array 30 (and the corresponding sensors) such that the dimensions of the optical train 100 may be reduced as will be discussed in greater detail below.

More specifically, FIG. 1A shows a side view of one embodiment of the invention with optical slits, FIG. 1B is a schematic side view of an optical multiplexer without optical slits where the sensor array(s) 30 is/are located at the focal plane of an optical train 100.

FIG. 2 shows a schematic aft view of the embodiment of the invention shown in FIG. 1A with optical slits in the context of an airborne imaging system. In the context of this description, the optical multiplexer is generally described as a system having two beam deflection devices 12*c*, 12*d* for collecting optical data from two fields of view 12', 12". In the context of an airborne imaging system, the negative x-axis is oriented in the aircraft heading direction, the y-axis is perpendicular to the direction of the flight path and the z-axis is vertical.

The system 10*a* (FIG. 1A) includes two beam deflection mirrors 12 where ray traces 12*a*, 12*b* for each of the two fields-of-view are shown as optically connected to a double slit 14 and focal plane array 30. The system may also include a common mirror 13 or other beam deflector and various combinations of known optical elements including foreoptics 16, collimator 18, spectral dispersive elements 20 and camera optics 22 as may be included in accordance with the particular design of an imager. In particular, it is understood within this description that many internally consistent types of such optical elements can be implemented or obtained commercially according to the spectral bandpass, fields of view and dispersive requirements of interest for a particular imager.

In this embodiment, the beam deflection system 12 deflects light from each of the two fields-of-view. After the mirrors 12, the two sets of rays 12*a*, 12*b* pass through appropriate foreoptics 16, slits 14, collimator 18, spectral dispersive elements 20 and camera optics 22 to the focal plane array 30.

It should be noted that in FIG. 1*a* the effect of dispersive elements (typically diffraction gratings or prisms) have been reduced within the drawings for clarity in order to show the displacement of the two sets of rays at the focal plane array. That is, in a typical embodiment, the dispersive elements would spread out the rays across much of the focal plane array as is shown schematically in FIG. 4 and discussed below. Avoidance of overlap in the spectral direction on the focal plane array by the two fields of view can be assured through a number of methods known to those skilled in the art including proper positioning and orientation of the slits and other optical elements, the use of bandpass filters and a restricted range of spectral sensitivity of the focal plane array, inter alia.

With reference to FIG. 2, FIG. 2 shows two sets of example ray traces imaging opposite sides of the nadir field of view. The different angles have been exaggerated in FIG. 2 to make the separation clearer. The angles of the mirrors are preferably set to ensure a small overlap at nadir to ensure that no areas are missed.

With reference to FIG. 3, FIG. 3 is a schematic diagram showing detail of the beam deflection devices where the effect of the different orientations can be seen.

Figure 4:
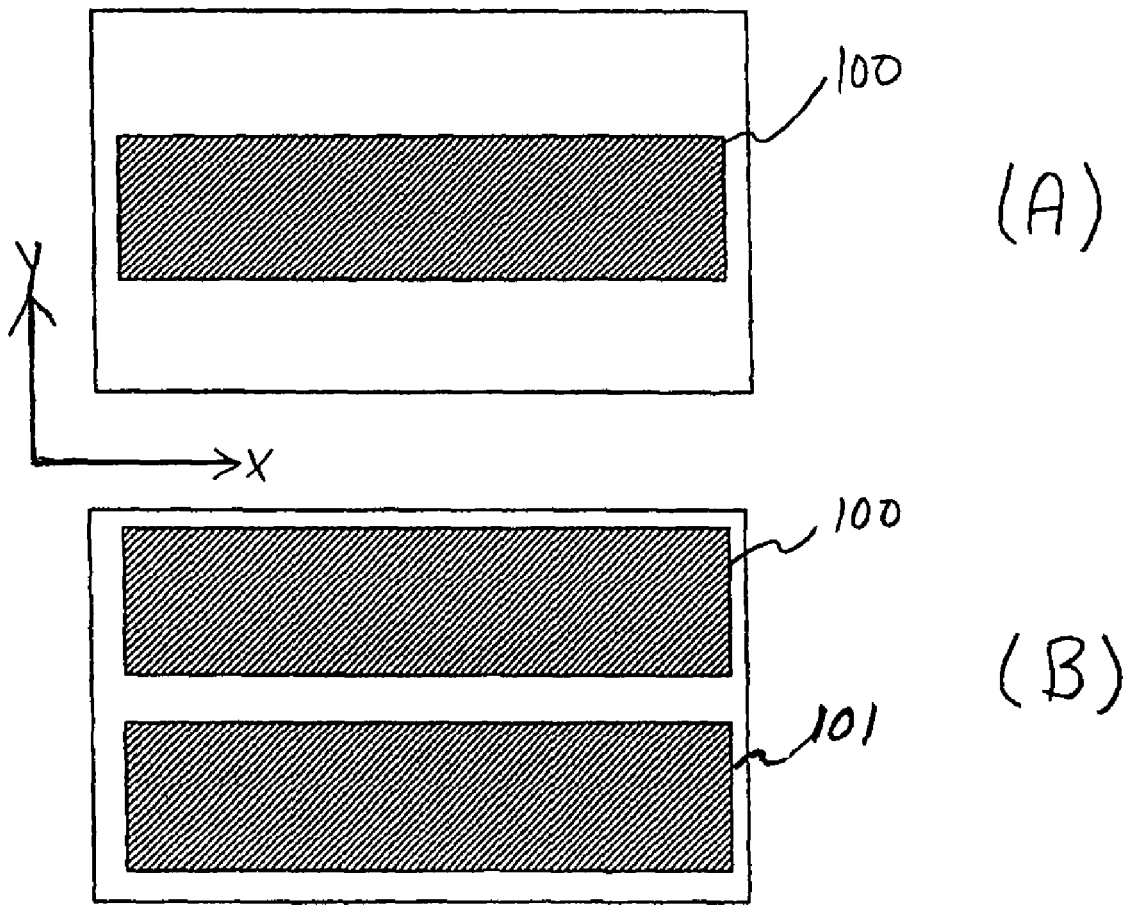
FIG. 4 is a schematic comparison of the utilization of the focal plane array in accordance with the prior art (A) and one embodiment of the invention (B)

With reference to FIG. 4, FIG. 4 is a schematic comparison of the utilization of the FPA in accordance with the prior art (A) and the invention (B). As shown, the across-track (x-track) direction is in the horizontal direction and the spectral dispersion is in the vertical direction (y-track) for the FPA. The FPA may typically include 340 x-track pixels and 240 y-track pixels.

In many applications, analysis of more than 100 spectral bands is impractical, and hence, greater than 50% of the y-track space of the FPA is not utilized for the typical 340 by 240 pixel sensor. In other words, up to only approximately 100 of 240 potential data sensors are utilized (FIG. 4A).

As shown in FIG. 4(B), two image areas 100 and 101 corresponding to optical data received from each of the two fields of view are shown. In one embodiment, one area 100 comprises the spectrally dispersed image from near-nadir to one side of the aircraft and the other 101 from near-nadir to the other side of the aircraft thus creating a "virtual" focal plane array with a doubled dimension in the across-track spatial direction. Accordingly, if each image processes 100 spectral bands on a 240 y-track sensor, 200 rows of 240 are being utilized instead of 100 of 240 in accordance with the prior art.

Figure 5:
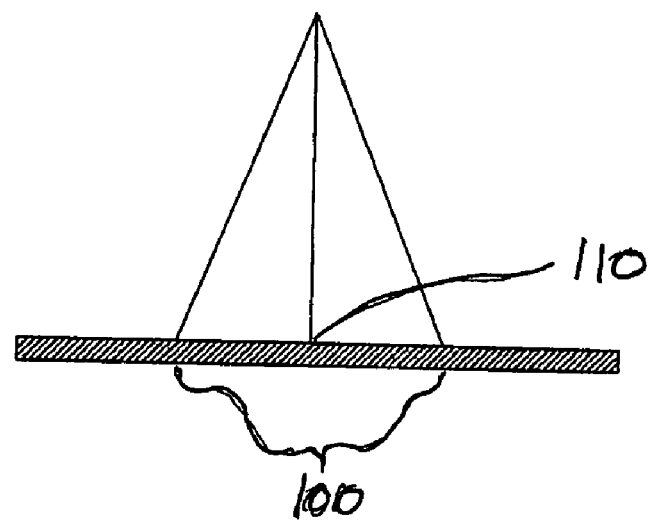
FIG. 5 is a schematic drawing of a typical across-track field-of-view in accordance with the prior art showing the ground projection of a single field of view system.
Figure 6:
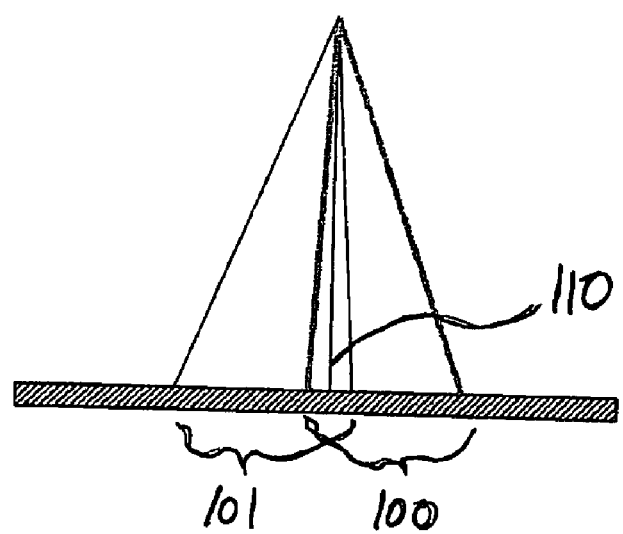
FIG. 6 is a schematic drawing of a typical across-track field-of-view in accordance with one embodiment of the invention showing the ground projection of two overlapping fields of view obtained with a multiplexed system; and, FIG. 7 is a schematic view of one embodiment of the invention incorporating a calibration source within the beam deflection system.

Practically, this utilization of the FPA sensor array in accordance with one embodiment of the invention may be used to effectively double the cross-track width (or resolution) of the system as shown schematically in FIGS. 5 and 6.

With reference to FIGS. 5 and 6, FIG. 5 is the base case showing an across-track field-of-view 100 of approximately 20 degrees on each side of nadir 110 for a traditional pushbroom scanner in accordance with the prior art. FIG. 6 shows a schematic across-track ground swath for two FOVs 100, 101 for an embodiment where the total across-track angular field-of-view is approximately the same as in FIG. 5 but with angular field-of-view of the optics that are approximately a factor of two less than the corresponding prior art pushbroom scanner. As shown in FIG. 6, since each of the FOVs can use essentially all of the angular field-of-view of the optics, the resolution across (i.e. the number of across-track pixels) the same swath is approximately doubled for the system of FIG. 6.

The overlap for the nadir look angle as shown in FIG. 6 has been exaggerated for greater clarity. Practically, the angular overlap at nadir would typically be set at 0.5 degrees, but this precise value is not critical.

Design Considerations and Applications

As is understood by those skilled in the art, the desired separation of the images on the FPA sensor combined with the focal distance of the lens or lenses that image the scene onto the FPA and the size of the entrance pupil or aperture of the imaging lens will determine the separation distance, orientation and size of the mirrors or other beam deflectors such as prisms within a particular system.

In one example, consider a single pixel within the focal plane array. The rays illuminating this pixel come from a small subset of the field of view. The rays illuminating a row of such pixels come from the full width of the field of view but only a narrow field of view in the other direction. The ray bundle illuminating another row of pixels comes from a different field of view (at right angles to the rows in question). At a certain distance from the optical assembly, these bundles of rays no longer overlap, and at this distance (and beyond) it is possible to place mirrors or other beam deflection devices to redirect these bundles, thereby independently modifying the field of view of each of the pixel rows.

For the case of a sensor located at the focal plane of an optical train, if the beam deflection systems are placed at a greater distance than the minimum required for the separation of the ray bundles then multiple adjacent rows on the focal plane array can be illuminated from each field of view described in the preceding paragraph, providing a two-dimensional view of scene without mixing of rays from the other ray bundle. In the case of a pushbroom imager where there is relative motion between the scene and the imager, the effect is to provide multiple successive views of the scene for each field of view, which can provide additional information. For example, if one of the fields of view in the fore-aft direction is spread over three adjacent rows, then the same area viewed by the first row at time T may be imaged by the second row at time T+1 and again by the third row at time T+2. If the sampling integration time is properly set to match the relative motion between the sensor and the area being imaged, then for this example case, three independent viewings of the same portion of the scene are generated at three successive sampling intervals. These three samples could then be used for such purposes as improving the signal-to-noise ratio without compromising the along-track spatial resolution.

For the case of a spectrographic implementation, the two (or more) different fields of view are spread over different rows on the focal plane array, which will result in slightly differing boundaries between spectral bands for the two (or more) differing fields of view. Spectral re-sampling according to a number of techniques well known to those skilled in the art can then be used to generate a common set of spectral bands for the two (or more) fields of view.

Similarly, a sub-pixel displacement of the two or more fields of view as seen by the sensor can be rectified by spatial re-sampling of the data in accordance with standard methods for geocorrection of remote sensing data.

Further still, in the case of an imaging spectrograph application, the slits may be separated sufficiently so that overlap of the spectra is avoided. If desired, band pass limiting filters can be employed to limit the spectral range of the radiation striking the sensor so as to minimize the required slit separation and still avoid such overlap. Such filtering can be done anywhere in the optical train, but would typically be enabled immediately in front of the sensor array or in front of (or behind) the slits.

It is also apparent that there is no need to limit the number of multiplexed channels (and slits or sensor rows) to two. That is, it is necessary only to increase the separation distance between the beam deflection system and the optical assembly so that the necessary ray bundle separation occurs, such that three or more distinct fields of view can be accessed via beam deflectors.

Figure 7:
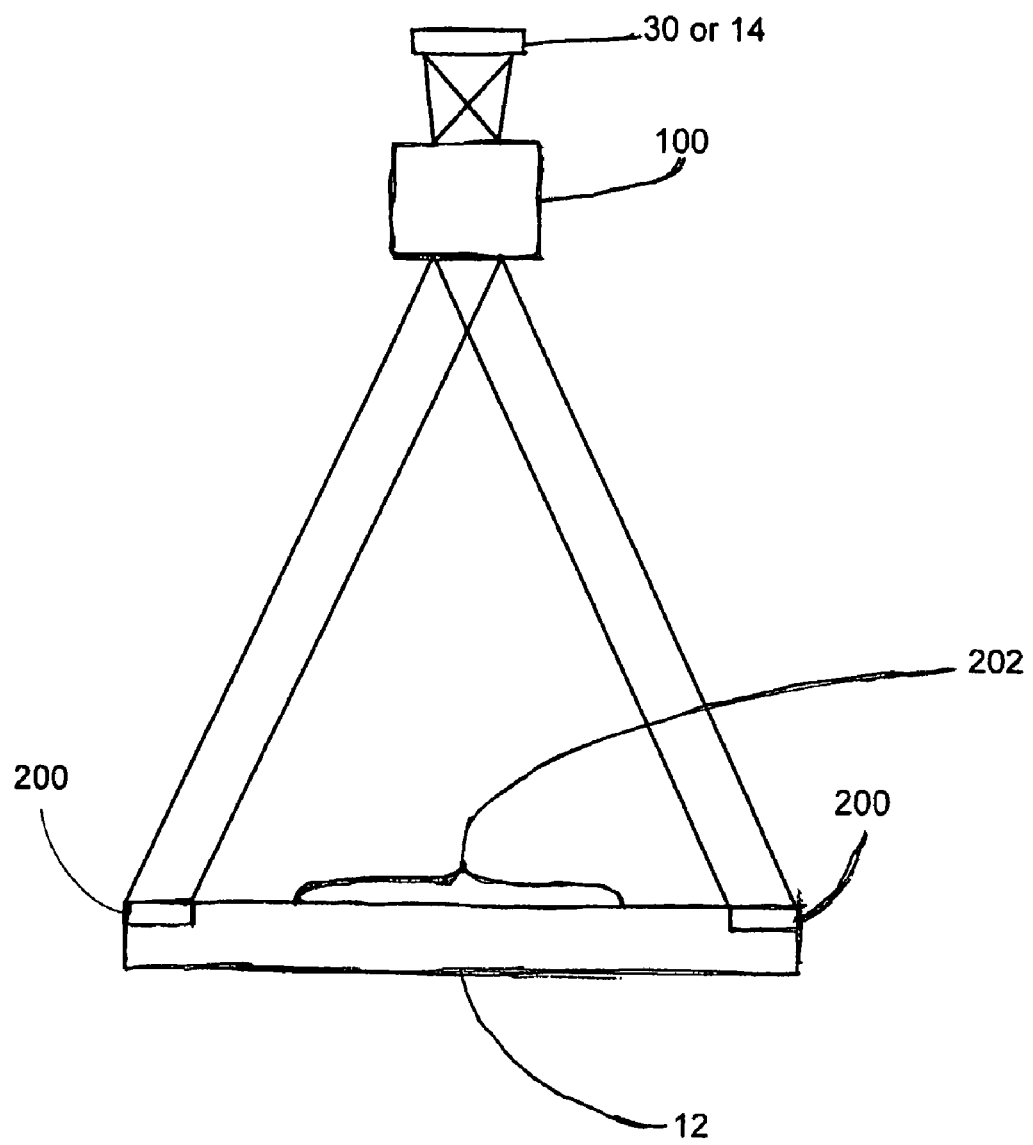

Furthermore, it is not necessary to employ all of the multiple fields of view to look at the scene. For example, with imaging systems it is often desirable to provide a calibration source within the field of view (FIG. 7). Thus, instead of one or more of the beam deflectors, one or more calibration targets 200 can be introduced (at approximately the same distance from the optical assembly) that will fill the field of view of one or more pixels within one of the rows or slits of the system. By separating the targets in the row direction and ensuring that their ray bundles do not overlap, multiple sources or targets can be employed, even while preserving a portion of the field of view for looking at the scene of interest.

As shown in FIG. 7, calibration sources 200 may be incorporated onto one or more of the outer regions of a beam deflection system 12 as a means of providing a continuous calibration source within the system. The calibration source(s) 200 may be any known calibration source as known to those skilled in the art such as a black body plate. In this embodiment, the rays from the calibration source fill the field of view of at least one pixel on the sensor (FIG. 1b) or a region corresponding to one pixel at the edge of one of the slits (FIG. 1a). An unvignetted FOV of interest 202 that does not include any rays from the calibration source is focused on the inner regions of the focal plane or slit.

In multiplexed systems such as described here, the required distance between the optical assembly and the beam deflectors can be sufficiently large to cause practical problems with the physical size of the overall system. Accordingly, one method to reduce the required separation distance is to reduce the optical aperture "height" in the direction at right angles to the sensor rows. Although this will reduce the sensitivity of the system, aperture reduction in one dimension of a few tens of percent will have only a small impact on optical throughput but will reduce the required separation distance between optical assembly and beam deflectors in direct proportion to the percentage reduction in aperture height.

Therefore, it is necessary that the beam deflectors 12 are sufficiently removed from the imager in order that the beams illuminating the separated rows of the sensor or slits in the case of an imaging spectrograph application, do not overlap spatially and are sufficiently large that their reflected images fill the field of view of the sensor. These design parameters may be determined through commercially available optical modelling software packages, such as "Zemax".

Furthermore, it is preferred that the beam deflectors be positioned and oriented such that there are no significant gaps in the nadir direction during the imaging of an area along a flight line. For greater clarity, in an airborne application, each of the fields-of-view can be treated as a separate flight line during analysis and geocorrection. The important alignment criterion is that there not be significant areas of interest on the ground that one or the other of the fields-of-view fails to image during the flight line.

In preferred embodiments (as shown in FIGS. 1a, 1b, 2 and 3), the two beam deflectors (12) are tilted outwards in order to provide the two fields-of-view from approximately nadir outwards to each side. An additional tilt in the forward-aft direction is also required to align the field of views for the preferred embodiment. This slight additional tilt of the deflecting mirrors means that the two approximately across-track fields-of-view of the ground available at the focal plane array have a slight angle with respect to each other and are not quite normal to the aircraft heading. That is, the fields-of-view of the ground available at the focal plane array have a slight V-shape with respect to each other. The degree of this non-orthogonality relative to the aircraft heading depends upon the orientation details of the mirrors, but typically leads to a reduction in the across-track swath on the ground of less than a few percent compared to what the swath dimension would be if the two fields of view were each orthogonal to the aircraft heading. This lack of orthogonality can be readily corrected in the final processed data by the use of geocorrection methodologies well known to those skilled in the art.

Stereo Imaging

In another embodiment, the optical multiplexer in accordance with the invention may be used to efficiently collect data for stereo imaging. In creating stereo images, two or more fields-of-view are oriented to view the same area on the ground at differing times and from a different fore-aft angle so as to create a stereo image. More specifically, the beam deflection devices are oriented so that both fields-of view are directed in an approximately nadir direction but with differing fore-aft viewing directions. This method of stereo imaging has several advantages over-traditional stereo imaging by providing constant fore-aft look angles with independent control of these angles (after appropriate removal of aircraft motion effects) that can lead to simpler and more consistent image interpretation (especially with computerized interpretation algorithms) than frame camera stereo pairs where the fore-aft look angle varies along the direction of flight. This stereo imaging methodology is applicable to both spectrographic and non-spectrographic embodiments.

Low Light Spectrograph

In another embodiment, the two or more fields-of-view are oriented to view the same area on the ground in an approximately nadir direction, not necessarily at the same time, and with the two slits having differing widths. The wider width slit increases the amount of light entering the spectrograph and although leading to a decrease in spectral and spatial resolution may be of significant value for image acquisition involving very low scene radiances.

Signal to Noise

In a still further embodiment, and as noted above, the beam deflection devices can be oriented so as to obtain data from the same field of view. By averaging the data from two images having the same field of view, the signal to noise ratio can be improved. This mode of operation is applicable to both spectrographic and non-spectrographic embodiments.

Bandpass Filters

In another non-spectrographic embodiment, optical filters may be utilized to isolate radiance associated with a narrow spectral wavelength region of interest. In this embodiment, multiple fields-of-view are oriented to view the same area on the ground in an approximately nadir direction, with spectral filters being used along one or more of the two or more separate ray paths prior to the image paths overlapping. The use of an optical filter for a panchromatic sensor enables images of the same area (to within the accuracies of the mirror alignments and/or the geocorrection process) to be obtained at more than one wavelength or to isolate particular radiance of interest.

System Advantages

In the context of aerial imaging, if an aircraft having an imager with the optical multiplexer in accordance with the invention is flown at a height above ground such that the swath width is approximately the same as for a system without the invention as shown in FIG. 5, then the approximate doubling of the number of across-track pixels means that the across-track pixel size is reduced by approximately a factor of two. If approximately square pixels in the raw data are desired, then the aircraft could be flown approximately half as fast for the same sampling frequency or the sampling frequency for the focal plane array could be increased by approximately a factor of two with the net effect of improving the spatial resolution by approximately a factor of two.

Alternatively, if a system having the optical multiplexer were flown at a higher altitude so that the across-track pixel resolution is approximately equal to that obtained with a traditional push-broom scanner as in FIG. 5, then the ground swath is approximately doubled. The net effect would be to decrease the number of flight lines needed to cover a large area of interest.

With appropriate flight planning, the operator may choose to adopt some combination of the two operational choices described above to both improve the spatial resolution and to expand the ground swath width.

Importantly, the system enables a reduced diameter of the optical components compared to the number of across-track spatial pixels as shown in FIG. 1. In a normal optical system without the optical multiplexer (A) and (B), in order to double the number of across-track pixels in a 360 (x-track) by 120 (y-track) pixel sensor array to a 720 (x-track) by 120 (y-track) pixel sensor array requires an approximate doubling in the diameter of at least some of the optical elements. That is, in order to double the number of across-track pixels a substantial increase in the diameter of the optical components is required, resulting in increased volume, weight and cost.

With the use of the present invention (C) a doubling of the number of across track pixels can be achieved with only a minor increase in the diameter of the optical component (to allow for the slightly off-axis paths of the two fields-of-view). As shown at (C), two 360 (x-track) by 120 (y-track) pixel sensor arrays can be positioned side-by-side or adjacent to one another (or one 360 by 240 sensor array) with significantly smaller diameter optical components as compared to (B). As a result, significant cost, volume and weight savings of the optical train can be achieved.

Although the present invention has been described and illustrated with respect to preferred embodiments and preferred uses thereof, it is not to be so limited since modifications and changes can be made therein which are within the full, intended scope of the invention.

The invention claimed is:

1. An optical multiplexer for increasing optical data collection efficiency received simultaneously across two or more fields of view comprising:

a first optical path for operatively receiving optical data from a first field of view;

a second optical path having a second optical path beam deflection system for operatively receiving optical data from a second field of view, the first optical path and second optical path beam deflection system for directing the optical data from the first and second fields of view through a common optical train, the optical train for focusing the optical data passing through the optical train onto different sections of one or more focal plane arrays;

wherein the second optical path beam deflection system is fixed relative to the second optical path.

2. An optical multiplexer as in claim 1 wherein the first optical path includes a first optical path beam deflection system.

3. An optical multiplexer as in claim 2 wherein any one of the first and second optical path beam deflection systems and optical train are dimensioned to enable multiple rows of a focal plane array sensor to obtain a two-dimensional view of the scene without vignetting.

4. An optical multiplexer as in claim 1 wherein the optical data from the first and second fields of view is directed through two different optical slits within the common optical train, one slit corresponding to each field of view.

5. An optical multiplexer as in claim 4 wherein the optical train enables wavelength dispersion of optical data from each field of view and wherein dispersed optical data corresponding to each spatial position from each field of view is recorded onto separate focal plane arrays corresponding to each field of view.

6. An optical multiplexer as in claim 5 wherein each focal plane array has a sufficient number of rows in the spectral dimension enabling at least two fields-of-view to be measured on adjacent sections of a single focal plane array.

7. An optical multiplexer as in claim 4 wherein the system includes more than two beam deflection systems and a corresponding number of optical slits for operatively receiving optical data from corresponding fields of view.

8. An optical multiplexer as in claim 4 wherein the two optical slits have different widths.

9. An optical multiplexer as in claim 4 wherein the optical train includes one or more wavelength dependent filters within the optical train to limit the spectral range of optical data reaching the one or more focal plane arrays to prevent overlap from spectrally dispersed fields-of-view.

10. An optical multiplexer as in claim 1 further comprising an additional common beam deflection system optically connected to the first and second optical path beam deflection systems for operatively directing optical data to the common optical train.

11. An optical multiplexer as in claim 1 wherein the first and second optical paths are operatively oriented to provide side by side fields of view.

12. An optical multiplexer as in claim 1 wherein the optical train is enabled for spectrographic imaging wherein two or more slits are coupled to a second optical train that provides wavelength dispersion.

13. An optical multiplexer as in claim 1 wherein the system includes more than two beam deflection systems and a corresponding number of focal plane arrays or sections on one or more focal plane arrays to receive optical data from corresponding fields of view.

14. An optical multiplexer as in claim 1 further comprising one or more bandpass or other optical filters optically connected to the optical train.

15. An optical multiplexer as in claim 1 wherein the focal plane array comprises photon sensing elements.

16. An optical multiplexer as in claim 1 wherein the focal plane array comprises energy flux sensing elements.

17. An optical multiplexer as in claim 1 wherein the focal plane array comprises separate focal plane arrays.

18. An optical multiplexer as in claim 1 wherein at least one field of view includes at least one calibration source.

19. An optical multiplexer as in claim 1 wherein the optical train includes an aperture that is restricted in one dimension to reduce the separation distance of at least one optical path of a corresponding optical path beam deflection system from the focal plane array while minimizing degradation in sensitivity and signal to noise ratio.

20. An optical multiplexer as in claim 1 wherein the first and second optical paths are operatively oriented to provide different fields of view.

21. An optical multiplexer as in any one of claims 1-10 wherein the first and second optical paths are operatively oriented to provide the same fields of view.

22. An optical multiplexer as in any one of claims 1-10 wherein the first and second optical paths are oriented such that each field-of view is directed in an approximately nadir direction but with a differing fore-aft viewing direction for creating stereo image data.

23. An optical multiplexer comprising:
a first beam deflection system for operatively receiving and re-directing spectral data from a first field of view;
a second beam deflection system for operatively receiving and re-directing spectral data from a second field of view;
a double slit having first and second adjacent optical slits, the first optical slit optically connected to the first beam deflection system and the second optical slit optically connected to the second beam deflection system; and
a focal plane array optically connected to the double slit through a common optical train wherein spectral data passing through the first and second optical slits is focused on adjacent sections of the focal plane array;
wherein the first and second beam deflection systems are fixed relative to the first and second optical slits respectively.

* * * * *